(12) United States Patent
Saigo et al.

(10) Patent No.: US 11,034,269 B2
(45) Date of Patent: Jun. 15, 2021

(54) SEAT CONTROL APPARATUS

(71) Applicant: TOYOTA JIDOSHA KABUSHIKI KAISHA, Toyota (JP)

(72) Inventors: Shintaro Saigo, Nisshin (JP); Satoshi Inoue, Anjo (JP); Terumasa Endo, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 212 days.

(21) Appl. No.: 16/418,471

(22) Filed: May 21, 2019

(65) Prior Publication Data

US 2019/0366888 A1 Dec. 5, 2019

(30) Foreign Application Priority Data

May 31, 2018 (JP) .............................. JP2018-105210

(51) Int. Cl.
| | |
|---|---|
| *B60N 2/42* | (2006.01) |
| *B60W 40/072* | (2012.01) |
| *B60W 40/109* | (2012.01) |
| *B60N 2/90* | (2018.01) |
| *B60N 2/02* | (2006.01) |

(52) U.S. Cl.
CPC ............ *B60N 2/4207* (2013.01); *B60N 2/99* (2018.02); *B60W 40/072* (2013.01); *B60W 40/109* (2013.01); *B60N 2002/026* (2013.01); *B60N 2002/0268* (2013.01)

(58) Field of Classification Search
USPC ...................................................... 701/36–49
See application file for complete search history.

(56) References Cited

U.S. PATENT DOCUMENTS

| | | | | |
|---|---|---|---|---|
| 7,299,118 | B2 * | 11/2007 | Enomoto | ............... B60R 21/013 |
| | | | | 297/480 |
| 8,504,248 | B2 * | 8/2013 | Taira | ..................... A61G 5/1056 |
| | | | | 701/49 |
| 9,758,073 | B2 * | 9/2017 | Knox | ........................ B60N 2/10 |
| 10,562,415 | B2 * | 2/2020 | Minato | ................ B60N 2/0727 |

(Continued)

FOREIGN PATENT DOCUMENTS

| | | |
|---|---|---|
| JP | 8216747 A | 8/1996 |
| JP | 2003002094 A | 1/2003 |

(Continued)

*Primary Examiner* — Jonathan L Sample
(74) *Attorney, Agent, or Firm* — Sughrue Mion, PLLC (57) ABSTRACT

A seat control apparatus controls a seat of a vehicle in which an occupant of the vehicle sits. The seat control apparatus includes an occupant weight recognition unit; an occupant sitting state recognition unit configured to recognize an occupant sitting state including at least either of a grip force of the occupant and a load applied to the occupant; a lateral acceleration estimation unit configured to estimate a subsequent lateral acceleration of the vehicle; and a seat controller configured to control the seat. The seat has an occupant support adjustment portion including at least one of a first adjustment portion, a second adjustment portion, and a third adjustment portion. The seat controller calculates an adjustment amount of the occupant support adjustment portion and controls the occupant support adjustment portion in response to the calculated adjustment amount.

4 Claims, 7 Drawing Sheets

(56) References Cited

U.S. PATENT DOCUMENTS

| | | | | |
|---|---|---|---|---|
| 10,882,424 B2* | 1/2021 | Knox | .................. | B60N 2/10 |
| 2006/0025897 A1* | 2/2006 | Shostak | .................. | G08G 1/017 |
| | | | | 701/1 |
| 2006/0253240 A1* | 11/2006 | Rao | .................. | B60W 50/0205 |
| | | | | 701/48 |
| 2008/0161989 A1* | 7/2008 | Breed | .................. | B60R 21/01532 |
| | | | | 701/31.4 |
| 2011/0172886 A1* | 7/2011 | Taira | .................. | B62K 5/027 |
| | | | | 701/49 |
| 2012/0089299 A1* | 4/2012 | Breed | .................. | B60N 2/888 |
| | | | | 701/36 |
| 2013/0096779 A1* | 4/2013 | Erlacher | .................. | B60R 21/015 |
| | | | | 701/45 |
| 2014/0358378 A1* | 12/2014 | Howard | .................. | F16F 15/022 |
| | | | | 701/45 |
| 2017/0129373 A1* | 5/2017 | Knox | .................. | B60N 2/10 |
| 2017/0136842 A1* | 5/2017 | Anderson | .................. | B60G 17/0195 |
| 2018/0105082 A1* | 4/2018 | Knox | .................. | B60N 2/501 |
| 2018/0222518 A1* | 8/2018 | Hill | .................. | B60W 30/18145 |
| 2018/0334062 A1* | 11/2018 | Park | .................. | B60N 2/39 |

FOREIGN PATENT DOCUMENTS

| | | |
|---|---|---|
| JP | 2009-286153 A | 12/2009 |
| JP | 2015039913 A | 3/2015 |
| JP | 2017-065343 A | 4/2017 |
| JP | 2017071370 A | 4/2017 |
| JP | 2017-132383 A | 8/2017 |
| JP | 2017-132384 A | 8/2017 |
| JP | 2017-190135 A | 10/2017 |
| JP | 2017-226253 A | 12/2017 |
| JP | 2017-226343 A | 12/2017 |

\* cited by examiner

SEAT CONTROL APPARATUS

CROSS-REFERENCE TO RELATED APPLICATION

This application claims the benefit of priority from Japanese Patent Application No. 2018-105210, filed May 31, 2018, the entire contents of which are incorporated herein by reference.

TECHNICAL FIELD

The present disclosure relates to a seat control apparatus.

BACKGROUND

Japanese Unexamined Patent Publication No. 2017-132383 regarding a seat control apparatus has been published. This patent document discloses a seat control apparatus that calculates a position/posture for a relaxation position based on a measured physique of a driver, and adjusts a seat to the calculated position/posture in autonomous driving control of a vehicle.

SUMMARY

In seat control, the position of an armrest or the like of a seat is adjusted based on subsequent lateral acceleration of a vehicle. In this case, because a load applied to an occupant due to lateral acceleration changes in response to a sitting state of the occupant sitting in the seat, desirably, the seat is controlled in response to not only subsequent lateral acceleration but also the sitting state of the occupant.

In the present technical field, there is a need for providing a seat control apparatus capable of appropriately retaining a posture of an occupant in response to a subsequent lateral acceleration of a vehicle and a sitting state of the occupant sitting in a seat.

According to an aspect of the present disclosure, there is provided a seat control apparatus that controls a seat of a vehicle in which an occupant of the vehicle sits, the apparatus including: an occupant weight recognition unit configured to recognize a weight of the occupant sitting in the seat; an occupant sitting state recognition unit configured to recognize an occupant sitting state including at least either of a grip force of the occupant detected by a grip sensor provided in a grip portion which the occupant sitting in the seat is capable of gripping, and a load applied to the occupant and detected by an armrest sensor provided in an armrest of the seat; a lateral acceleration estimation unit configured to estimate a subsequent lateral acceleration of the vehicle based on a curvature of a road on which the vehicle travels and a vehicle speed of the vehicle; and a seat controller configured to control the seat based on the occupant sitting state and the subsequent lateral acceleration. The seat has an occupant support adjustment portion including at least one of a first adjustment portion configured to adjust a protrusion amount of a shoulder supporting portion supporting a shoulder of the occupant sitting in the seat, a second adjustment portion configured to adjust the position of the armrest; and a third adjustment portion configured to adjust a tilt angle of the seat in a roll angle direction of the vehicle. The seat controller calculates an adjustment amount of the occupant support adjustment portion based on the occupant sitting state and the subsequent lateral acceleration, and controls the occupant support adjustment portion in response to the calculated adjustment amount.

In the seat control apparatus according to the aspect of the present disclosure, the occupant sitting state recognition unit recognizes the occupant sitting state including at least either of a grip force applied to the grip portion and a load applied to the armrest. The seat controller controls the occupant support adjustment portion in response to the adjustment amount calculated based on the occupant sitting state and the subsequent lateral acceleration. Therefore, it is possible to adjust the occupant support adjustment portion while taking into consideration the fact that a load applied to the occupant may change in response to the occupant sitting state. For this reason, it is possible to appropriately retain a posture of the occupant in response to the subsequent lateral acceleration of the vehicle and the sitting state of the occupant sitting in the seat.

In the embodiment, the vehicle may be an vehicle capable of executing an autonomous driving control. The grip portion may include a steering wheel of the vehicle. The occupant sitting state recognition unit may recognize the occupant sitting state of whether the occupant grips the steering wheel based on a grip force applied to the steering wheel. When the vehicle is not under autonomous driving control, or the occupant grips the steering wheel while the vehicle is under autonomous driving control, the seat controller may not control the occupant support adjustment portion. In this case, it is possible to secure ease of movement when the occupant grips the steering wheel and performs steering.

In the embodiment, the shoulder supporting portion and the armrest may be respectively provided in the seat on both right and left sides of the occupant. When the vehicle travels around a curve, the seat controller may control the first adjustment portion and the second adjustment portion which correspond to an outside of the curve. In this case, it is possible to effectively retain a posture of the occupant via the shoulder supporting portion and the armrest which correspond to the outside of the curve.

According to various forms and embodiments of the present disclosure, it is possible to appropriately retain a posture of the occupant in response to the subsequent lateral acceleration of the vehicle and the sitting state of the occupant sitting in the seat.

DETAILED DESCRIPTION

Hereinafter, an embodiment of the present disclosure will be described with reference to the drawings. For the sake of expediency, the same reference signs will be assigned to substantially the same elements, and description thereof may be omitted.

Figure 1:
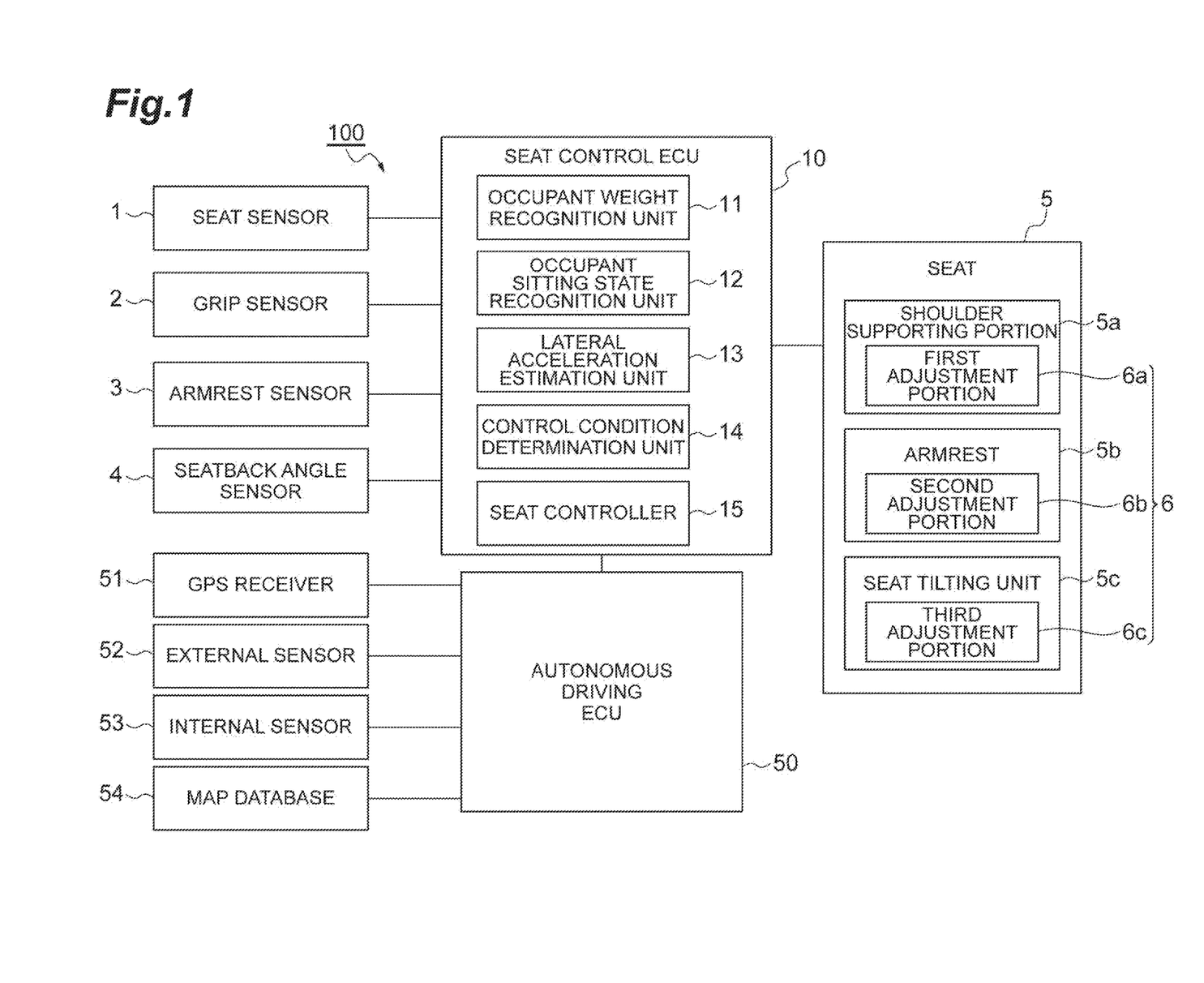
FIG. 1 is a block diagram illustrating a configuration of a seat control apparatus according to an embodiment.

FIG. 1 is a block diagram illustrating a seat control apparatus according to the embodiment. As illustrated in FIG. 1, a seat control apparatus 100 is an apparatus that controls a seat 5 of a vehicle, in which an occupant of the vehicle sits. The seat control apparatus 100 is installed in a vehicle such as a passenger vehicle.

The vehicle is a vehicle capable of executing an autonomous driving control. The autonomous driving is a driving state where vehicle control is executed such that a vehicle autonomously travels to a preset destination. The destination may be set by an occupant of a vehicle or automatically. In the autonomous driving, an occupant does not need to drive a vehicle, but the vehicle travels autonomously. During the autonomous driving control, a state (referred to as hands-off mode) where an occupant does not grip a steering wheel may be allowed under predetermined preset conditions. In the description below, a vehicle which is an object of autonomous driving is simply referred to a "vehicle". The occupant may be a driver of a vehicle, and may not necessarily be a driver. The driver implies an occupant sitting in the seat 5 that is provided at a position where the occupant can operate the steering of a vehicle.

Figure 2:
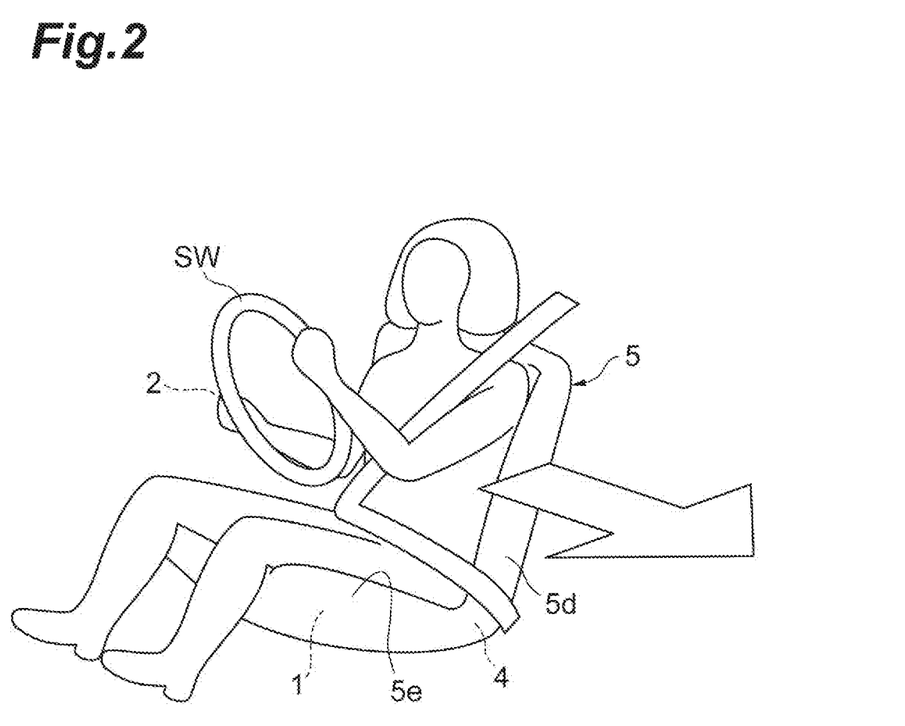
FIG. 2 is a schematic view illustrating an occupant sitting in a seat.

FIG. 2 is a schematic view illustrating an occupant sitting in a seat. As illustrated in FIG. 2, the seat 5 is a seat in which the occupant of the vehicle sits. The vehicle is provided with the same number of the seats 5 as an occupant capacity of the vehicle. In the description below, the seat 5 includes at least the seat 5 in which a driver sits among a plurality of the seats 5. The seat 5 includes an occupant supporting portion having the function of restricting movement of the occupant in a lateral direction. The occupant supporting portion includes a shoulder supporting portion 5a, an armrest 5b, and a seat tilting unit 5c. The shoulder supporting portion 5a is part of the seat 5 which supports the shoulders of the occupant sitting in the seat 5. The armrest 5b supports an arm or an elbow of the occupant sitting in the seat 5. The seat tilting unit 5c is a mechanism that tilts the seat 5 in a roll angle direction.

Figure 3:
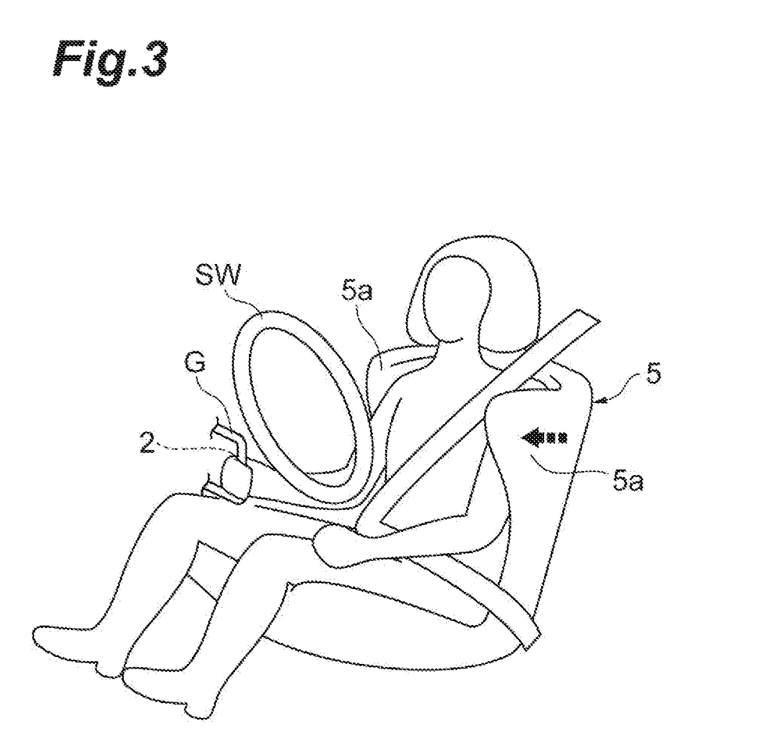
FIG. 3 is a schematic view for explaining a shoulder supporting portion.

FIG. 3 is a schematic view for explaining a shoulder supporting portion. As illustrated in FIG. 3, the shoulder supporting portions 5a are respectively provided on the right and left sides of the seat 5 at the positions of both shoulders of the occupant, for example. The shoulder supporting portions 5a restricts movement of the occupant in the lateral direction by supporting the shoulder of the occupant, who sits in the seat 5, from the outside. The shoulder supporting portions 5a are not limited to parts that support both shoulders of the occupant in the seat 5, but may be side parts of the seat 5 which can restrict movement of the upper body of the occupant in the lateral direction.

Figure 4:
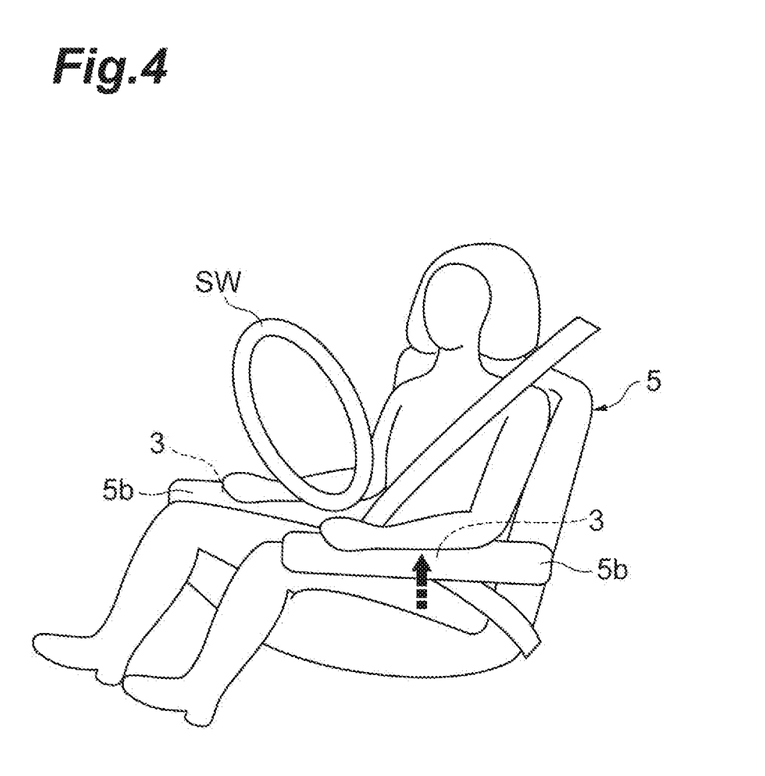
FIG. 4 is a schematic view for explaining an armrest.

FIG. 4 is a schematic view for explaining an armrest. As illustrated in FIG. 4, the armrest 5b is an elbow rest provided in a side part of the seat 5. The armrest 5b restricts movement of the occupant in the lateral direction by coming into contact with the torso of the occupant when the occupant in the seat 5 slips laterally. The armrests 5b are respectively provided on both right and left sides of the seat 5. The armrest 5b may be provided on one side of the seat 5.

Figure 5:
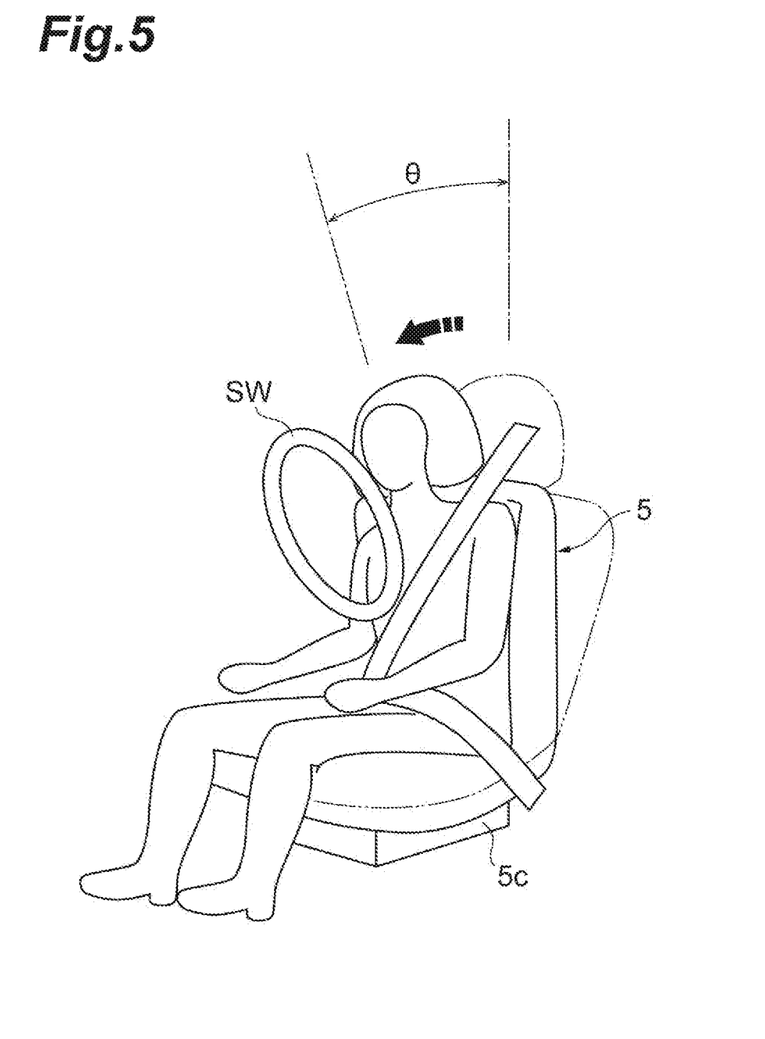
FIG. 5 is a schematic view for explaining a seat tilting unit.

FIG. 5 is a schematic view for explaining a seat tilting unit. As illustrated in FIG. 5, the seat tilting unit 5c is provided in a bottom part of the seat 5. When the vehicle travels around a curve, the seat tilting unit 5c tilts the entirety of the seat 5 toward the center of curvature of the curve in the roll angle direction of the vehicle (so-called reverse rolling). The seat tilting unit 5c reduces effects of lateral acceleration applied to the occupant by tilting the upper body of the occupant sitting in the seat 5, thus preventing movement of the occupant in the lateral direction.

Configuration of Seat Control Apparatus 100

As illustrated in FIG. 1, the seat control apparatus 100 includes a seat control electronic control unit (ECU) 10 and an autonomous driving ECU 50. Each of the seat control ECU 10 and the autonomous driving ECU 50 is an electronic control unit including a central processing unit (CPU), a read only memory (ROM), a random access memory (RAM), a controller area network (CAN) communication circuit, and the like. Each of the seat control ECU 10 and the autonomous driving ECU 50 realizes various functions by loading a program, which is stored in the ROM, onto the RAM, and executing the program loaded onto the RAM via the CPU. Each of the seat control ECU 10 and the autonomous driving ECU 50 may be include a plurality of electronic units.

The seat control ECU 10 is connected to a seat sensor 1, a grip sensor 2, an armrest sensor 3, a seatback angle sensor 4, the seat 5, and the autonomous driving ECU 50.

The seat sensor 1 is a detector that detects a weight of the occupant sitting in the seat 5. The seat sensor 1 is built-in under a sitting surface 5e of the seat 5 (refer to FIG. 2). A piezo-electric element may be used as the seat sensor 1. A plurality of piezo-electric elements may be provided as the seat sensor 1 to detect a distribution of the weight of the occupant on the sitting surface 5e of the seat 5. The seat sensor 1 transmits information regarding the detected weight of the occupant to the seat control ECU 10.

The grip sensor 2 is a detector provided in a grip portion that can be gripped by the occupant sitting in the seat 5. Examples of the grip portion include a steering wheel SW (refer to FIG. 2) and a posture retention grip G (refer to FIG. 3). Examples of the posture retention grip G include an assist grip provided in the interior of the vehicle and a door grip provided on an interior door lining of the vehicle. The grip sensor 2 detects a force (grip force of occupant) of when the occupant grips the grip portion with the hand. The grip sensor 2 may detect a load of when the occupant pushes the grip portion with the hand and a load of when the occupant pulls the grip portion with the hand. The grip sensor 2 may detect whether the hand of the occupant is in contact with the grip portion. A piezo-electric element may be used as the grip sensor 2. The grip sensor 2 transmits information regarding the detected grip force of the occupant to the seat control ECU 10.

The armrest sensor 3 is a detector provided in the armrest 5b (refer to FIG. 4). The armrest sensor 3 detects a pressure load (load applied to the armrest 5b) applied to the armrest sensor 3 by an arm or an elbow of the occupant. The armrest sensor 3 may detect whether an arm or an elbow of the occupant is in contact with the armrest 5b. A piezo-electric element may be used as the armrest sensor 3. The armrest sensor 3 transmits information regarding the detected load to the armrest 5b to the seat control ECU 10.

The seatback angle sensor 4 is provided in the vicinity of a pivot shaft of a seatback (backrest) 5d of the seat 5 (refer to FIG. 2). The seatback angle sensor 4 is a detector that detects a pivot angle of the seatback 5d in a pitch direction of the vehicle. The seatback angle sensor 4 detects an angle (seatback angle) of the seatback 5d relative to the sitting surface 5e of the seat 5, for example. A well-known rotational angle sensor may be used as the seatback angle sensor 4. The seatback angle sensor 4 transmits information regarding the detected seatback angle to the seat control ECU 10.

The seat 5 includes an occupant support adjustment portion 6 that controls the occupant supporting portion in response to control signals from the seat control ECU 10.

The occupant support adjustment portion 6 includes a first adjustment portion 6a provided in the shoulder supporting portion 5a, a second adjustment portion 6b provided in the armrest 5b, and a third adjustment portion 6c provided in the seat tilting unit 5c.

As illustrated in FIG. 3, the first adjustment portion 6a adjusts a protrusion amount of the shoulder supporting portion 5a. The first adjustment portion 6a may be a mechanism that can advance and retract from the shoulder of the occupant via an electric motor or the like. The first adjustment portion 6a may be an airbag or the like which increases the protrusion amount of the shoulder supporting portion 5a via inflation.

As illustrated in FIG. 4, the second adjustment portion 6b adjusts the position (position of the armrest 5b) of an upper surface of the armrest 5b relative to an arm or an elbow of the occupant sitting in the seat 5, for example. The second adjustment portion 6b adjusts the position of the armrest 5b on a side of the seat 5 in a vertical direction of the vehicle, for example. The second adjustment portion 6b may be a mechanism that translate the armrest 5b relative to the seat 5, or a mechanism that pivots the armrest 5b relative to the seat 5. Alternatively, when the armrest is configured such that part of the upper surface, on which an elbow or an arm of the occupant is placed, can protrude upward, the second adjustment portion 6b may be a mechanism, an airbag, or the like which can advance and retract to adjust the protrusion amount in an upward direction.

As illustrated in FIG. 5, the third adjustment portion 6c adjusts the seat tilting unit 5c such that the entirety of the seat 5 is tilted at a reverse roll angle θ. The reverse roll angle is a tilt angle of the entirety of the seat 5 with respect to the vertical direction of the vehicle when the seat 5 is tilted toward the center of curvature of a curve. The third adjustment portion 6c may be a mechanism or the like which drives the bottom part of the seat 5 such that the entirety of the seat 5 is pivoted around the vicinity of the pelvis of the waist of the occupant while sitting, for example.

The autonomous driving ECU 50 is connected to a GPS receiver 51, an external sensor 52, an internal sensor 53, and a map database 54.

The GPS receiver 51 is a measurement unit that measures the position (for example, latitude and longitude of vehicle) of the vehicle on a map by receiving signals from three or more GPS satellites. The GPS receiver 51 transmits measured position information of the vehicle to the autonomous driving ECU 50.

The external sensor 52 is an in-vehicle detector that detects situations in the periphery of the vehicle. The external sensor 52 includes at least one of a camera and a radar sensor.

The camera is an imaging device that captures images of situations outside the vehicle. The camera is provided on the back side of a front windshield of the vehicle. The camera transmits image information of the situations outside the vehicle to the autonomous driving ECU 50. The camera may be a monocular camera or a stereo camera. The stereo camera includes two imaging units disposed to reproduce binocular parallax. Image information obtained by the stereo camera includes information in a depth direction.

The radar camera is a detector that detects obstacles in the periphery of the vehicle by using radio waves (for example, millimeter waves) or light. Examples of the radar sensor include a millimeter wave radar or a light detection and ranging (LIDAR). The radar sensor detects obstacles by transmitting radio waves or light to the periphery of the vehicle, and receiving radio waves or light reflected by the obstacles. The radar sensor transmits information regarding the detected obstacles to the autonomous driving ECU 50.

The internal sensor 53 is a detector that detects a traveling state of the vehicle. Examples of the internal sensor 53 include a vehicle speed sensor, an acceleration sensor, and a yaw rate sensor. The vehicle speed sensor is a detector that detects a speed of the vehicle. The vehicle speed sensor may be a wheel speed sensor that is provided in a wheel of the vehicle, a drive shaft rotating integrally with wheels, or the like to detect a rotational speed of the wheel. The vehicle speed sensor transmits information (wheel speed information) regarding the detected vehicle speed to the autonomous driving ECU 50.

The acceleration sensor is a detector that detects an acceleration of the vehicle. The acceleration sensor includes a forward and backward acceleration that detects acceleration in a forward and backward direction of the vehicle, and a lateral acceleration sensor that detects a lateral acceleration of the vehicle, for example. The acceleration sensor transmits information regarding the acceleration of the vehicle to the autonomous driving ECU 50. The yaw rate sensor is a detector that detects a yaw rate (rotation angular speed) around a vertical axis of gravity of the vehicle. A gyro sensor may be used as the yaw rate sensor. The yaw rate sensor transmits information regarding the detected yaw rate of the vehicle to the autonomous driving ECU 50. The detection information (vehicle speed information, yaw rate information, and the like) obtained by the internal sensor 53 may be used to measure the position of the vehicle on a map.

The map database 54 is a database storing map information. The map database 54 is stored in a hard disk drive (MD) installed in the vehicle, for example. The map information includes position information of roads, road shape information (curves, classifications of straight parts, curvatures of curves, and the like), position information of intersections and branches, and position information of structures. The map information may include information regarding sections that are preallocated on a map as sections where autonomous driving is allowed. The map database 54 may be stored in a server capable of communicating with the vehicle.

The autonomous driving ECU 50 generates a traveling plan along a preset target route based on the position information of the vehicle measured by the GPS receiver 51, the map information of the map database 54, the situations (positions of vehicles other than the host vehicle, and the like) in the periphery of the vehicle recognized from the detection results of the external sensor 52, the states (vehicle speed, yaw rate, and the like) of the vehicle recognized from the detection results of the internal sensor 53. The target route is set by the occupant of the vehicle or a well-known navigation system. The navigation system may be integrally built with the autonomous driving ECU 50. Part of functions of the autonomous driving ECU 50 may be executed in a server capable of communicating with the vehicle.

The autonomous driving ECU 50 executes autonomous driving according to the traveling plan. Examples of the traveling plan include a target path and a target speed. The autonomous driving ECU 50 executes autonomous driving by transmitting control signals to actuators (engine actuators, steering actuator, brake actuator, and the like) of the vehicle. The autonomous driving ECU 50 can execute the generation of the traveling plan and autonomous driving via well-known technique.

Subsequently, a functional configuration of the seat control ECU 10 will be described. The seat control ECU 10 includes an occupant weight recognition unit 11, an occupant sitting state recognition unit 12, a lateral acceleration estimation unit 13, a control condition determination unit 14, and a seat controller 15. Part of functions of the seat control ECU 10, which will be described hereinbelow, may be executed in a server capable of communicating with the vehicle.

The occupant weight recognition unit 11 recognizes a weight of the occupant sitting in the seat 5 based on detection results of the seat sensor 1. The occupant weight recognition unit 11 may recognize a distribution of the weight of the occupant on the sitting surface 5e of the seat 5.

The occupant sitting state recognition unit 12 recognizes an occupant sitting state based on detection results of the grip sensor 2, the armrest sensor 3, and the seatback angle sensor 4. The occupant sitting state implies a physical state of supporting the occupant, which influences the magnitude of a load applied to the occupant sitting in the seat 5. The load applied to the occupant implies a load (muscle load) that is applied to muscles of the torso or the like of the occupant when the occupant tries to retain a posture against a centrifugal force (force in the direction of arrow in FIG. 2). For example, the occupant sitting state includes a state of the occupant being supported with respect to a grip force applied to the grip portion, a state of the occupant being supported with respect to a load applied to the armrest 5b, and a state of the occupant being supported with respect to a seatback angle.

The occupant sitting state recognition unit 12 recognizes the occupant sitting state of whether the occupant grips the steering wheel SW based on a grip force of the occupant which is applied to the steering wheel SW and detected by the grip sensor 2. For example, when the detected grip force applied to the steering wheel SW is greater than or equal to a predetermined threshold, the occupant sitting state recognition unit 12 recognizes an occupant sitting state where the occupant grips the steering wheel SW. When the detected grip force applied to the steering wheel SW is less than the predetermined threshold, the occupant sitting state recognition unit 12 recognizes an occupant sitting state where the occupant does not grip the steering wheel SW. The occupant sitting state recognition unit 12 may compare the detected grip force applied to the steering wheel SW with a plurality of thresholds, and recognize the occupant sitting state, in a plurality of stepwise levels, the magnitude of the grip force applied to the steering wheel SW. The plurality of levels may be level 1, level 2, and level 3 in the increasing order of the magnitude of a load, for example.

The occupant sitting state recognition unit 12 recognizes the occupant sitting state of whether the occupant grips the posture retention grip G based on a grip force of the occupant which is applied to the posture retention grip G and detected by the grip sensor 2. For example, when the detected grip force applied to the posture retention grip G is greater than or equal to a predetermined threshold, the occupant sitting state recognition unit 12 recognizes an occupant sitting state where the occupant grips the posture retention grip G to the extent that a posture of the upper body of the occupant is retained. When the detected grip force applied to the posture retention grip G is less than the predetermined threshold, the occupant sitting state recognition unit 12 recognizes an occupant sitting state where the occupant does not grip the posture retention grip G. The occupant sitting state recognition unit 12 may compare the detected grip force applied to the posture retention grip G with a plurality of thresholds, and recognize the occupant sitting state, in a plurality of stepwise levels, the magnitude of the grip force applied to the posture retention grip G, for example.

The occupant sitting state recognition unit 12 recognizes the occupant sitting state of whether the armrest 5b supports an arm or an elbow of the occupant based on a load applied to the armrest 5b which is detected by the armrest sensor 3. For example, when the detected load applied to the armrest 5b is greater than or equal to a predetermined threshold, the occupant sitting state recognition unit 12 recognizes an occupant sitting state where the armrest 5b supports the arm or the elbow of the occupant to the extent that a posture of the upper body of the occupant is retained. When the detected load applied to the armrest 5b is less than the predetermined threshold, the occupant sitting state recognition unit 12 recognizes an occupant sitting state where the armrest 5b does not support the arm or the elbow of the occupant. The occupant sitting state recognition unit 12 may compare the detected load applied to the armrest 5b with a plurality of thresholds, and recognize the occupant sitting state, in a plurality of stepwise levels, the magnitude of the load applied to the armrest 5b, for example.

The occupant sitting state recognition unit 12 may recognize the occupant sitting state of whether the seatback 5d supports the back of the occupant in the lateral direction based on a seatback angle detected by the seatback angle sensor 4. For example, when the seatback 5d is laid such that the detected seatback angle falls within a predetermined angle range, the occupant sitting state recognition unit 12 recognizes an occupant sitting state where the back of the occupant is supported to the extent that a posture of the upper body of the occupant is retained in the lateral direction due to a friction force between the back and the seatback 5d. When the seatback 5d is raised up at the detected seatback angle out of the predetermined angle range, the occupant sitting state recognition unit 12 recognizes an occupant sitting state where the seatback 5d does not support the back of the occupant in the lateral direction. The occupant sitting state recognition unit 12 may compare the detected seatback angle with a plurality of angle ranges, and recognize the occupant sitting state, in a plurality of stepwise levels, the magnitude of the friction force between the back and the seatback 5d, for example.

The lateral acceleration estimation unit 13 estimates a subsequent lateral acceleration of the vehicle based on a curvature of a vehicle traveling road, and a vehicle speed of the vehicle. The curvature of the vehicle traveling road may be the curvature of a curve on the target path of the traveling plan generated by the autonomous driving ECU 50, or a curvature of a curve in the map information of the map database 54. The vehicle speed of the vehicle may be a target vehicle speed of the traveling plan generated by the autonomous driving ECU 50, or a vehicle speed of the vehicle detected by the internal sensor 53.

For example, when the seat 5 is tilted by the third adjustment portion 6c, the lateral acceleration estimation unit 13 corrects a subsequent lateral acceleration applied to the occupant sitting in the seat 5 in response to the subsequent lateral acceleration estimated based on the curvature of the vehicle traveling road and the vehicle speed of the vehicle, and a reverse roll angle (tilt angle of the seat 5) θ calculated by the seat controller 15 that will be described later. The lateral acceleration estimation unit 13 can calculate a corrected subsequent lateral acceleration $a_1$ using the following equation (1). The seat controller 15 which will be described later uses the corrected subsequent lateral acceleration as the subsequent lateral acceleration estimated by the lateral acceleration estimation unit 13.

$$a_1 = a_0 \cdot \cos\theta - g \cdot \sin\theta \quad (1)$$

$a_1$: corrected subsequent lateral acceleration
$a_0$: uncorrected subsequent lateral acceleration
$\theta$: reverse roll angle
$g$: gravitational acceleration The control condition determination unit 14 determines whether to execute seat adjustment control based on control signals from the autonomous driving ECU 50, and the recognized occupant sitting state of whether the occupant grips the steering wheel SW which is detected by the grip sensor 2. For example, when the vehicle is under autonomous driving control, and the occupant sitting state where the occupant does not grip the steering wheel SW is recognized, the control condition determination unit 14 determines that the seat controller 15 is required to execute seat adjustment control. When the vehicle is not under autonomous driving control, or the occupant sitting state where the occupant grips the steering wheel SW is recognized, the control condition determination unit 14 determines that the execution of seat adjustment control is not required.

When the control condition determination unit 14 determines that the execution of seat adjustment control is required, the seat controller 15 controls the seat 5 based on the weight of the occupant recognized by the occupant weight recognition unit 11, the occupant sitting state recognized by the occupant sitting state recognition unit 12, and the subsequent lateral acceleration estimated by the lateral acceleration estimation unit 13.

The seat controller 15 may control the third adjustment portion 6c such that the seat 5 is tilted, and make the lateral acceleration estimation unit 13 correct the subsequent lateral acceleration, which is estimated by the lateral acceleration estimation unit 13, in response to the tilt of the seat 5. More specifically, for example, the seat controller 15 calculates the reverse roll angle $\theta$ of the seat 5 based on the subsequent lateral acceleration estimated by the lateral acceleration estimation unit 13, and a seat tilt angle map. The seat tilt angle map is a map indicating the relationship between estimated subsequent lateral acceleration and a roll angle of the occupant. The roll angle of the occupant may be an angle between the vertical direction of the vehicle and an imaginary line passing through the center of the pelvis of the waist of the occupant. The reverse roll angle $\theta$ of the seat 5 may be limited by a predetermined preset upper limit value. The seat controller 15 controls the third adjustment portion 6c via well-known technique such that the seat 5 is tilted at the calculated reverse roll angle $\theta$.

The seat controller 15 calculates the magnitude of a load applied to the occupant sitting in the seat 5 based on the recognized weight of the occupant and the estimated subsequent lateral acceleration. The seat controller 15 calculates an adjustment amount of the occupant support adjustment portion 6 based on the calculated magnitude of the load to the occupant, and the recognized occupant sitting state. The seat controller 15 may calculate adjustment amounts of the first adjustment portion 6a and the second adjustment portion 6b based on a preset map.

For example, the seat controller 15 may calculate adjustment amounts of the first adjustment portion 6a and the second adjustment portion 6b based on the calculated magnitude of the load to the occupant, the recognized occupant sitting state of whether the occupant grips the posture retention grip G, and the recognized occupant sitting state of whether the armrest 5b supports an arm or an elbow of the occupant.

When the occupant sitting state where the occupant does not grip the posture retention grip G is recognized, the seat controller 15 further increases adjustment amounts of the first adjustment portion 6a and the second adjustment portion 6b than when the occupant sitting state where the occupant grips the posture retention grip G is recognized. The less a level (level 1, level 2, or level 3 described above) of the magnitude of the recognized grip force is which is applied to the posture retention grip G, the further the seat controller 15 may increase adjustment amounts of the first adjustment portion 6a and the second adjustment portion 6b in response to the level of the magnitude of the grip force.

When the occupant sitting state where the armrest 5b does not support an arm or an elbow of the occupant is recognized, the seat controller 15 further increases adjustment amounts of the first adjustment portion 6a and the second adjustment portion 6b than when the occupant sitting state where the armrest 5b supports the arm or the elbow of the occupant is recognized. The less a level of the magnitude of the detected load is which is applied to the armrest 5b, the further the seat controller 15 may increase adjustment amounts of the first adjustment portion 6a and the second adjustment portion 6b in response to the level of the magnitude of the load applied to the armrest 5b.

The seat controller 15 may correct the adjustment amounts of the first adjustment portion 6a and the second adjustment portion 6b based on the detected seatback angle. When the seatback 5d is laid such that the detected seatback angle falls within the predetermined angle range, the seat controller 15 may further decrease the adjustment amounts of the first adjustment portion 6a and the second adjustment portion 6b than when the seatback 5d is raised up at the detected seatback angle out of the predetermined angle range. The greater the seatback angle is, the further the seat controller 15 may increase the adjustment amounts of the first adjustment portion 6a and the second adjustment portion 6b in response to a level of the detected seatback angle.

The seat controller 15 controls the occupant support adjustment portion 6 in response to the calculated adjustment amounts. Specifically, the seat controller 15 controls the first adjustment portion 6a such that a protrusion amount of the shoulder supporting portion 5a is adjusted by the calculated adjustment amount of the first adjustment portion 6a. The seat controller 15 controls the second adjustment portion 6b such that the position of the armrest 5b is adjusted by the calculated adjustment amount of the second adjustment portion 6b. When the vehicle travels around a curve, the seat controller 15 may control the occupant support adjustment portion 6 corresponding to an outside (the direction of arrow in FIG. 2) of the curve.

When the control condition determination unit 14 determines that the execution of seat adjustment control is not required, the seat controller 15 may not control the occupant support adjustment portion 6. When the vehicle is not under autonomous driving control, the seat controller 15 may not control the occupant support adjustment portion 6. When the occupant grips the steering wheel SW while the vehicle is under autonomous driving control, the seat controller 15 may not control the occupant support adjustment portion 6.

Example of Computational Process Executed by Seat Control ECU 10

Subsequently, an example of a computational process executed by the seat control ECU 10 will be described. FIG.

6 is a flowchart illustrating an example of a condition determination process. The process illustrated in FIG. 6 is executed while the vehicle travels.

Figure 6:
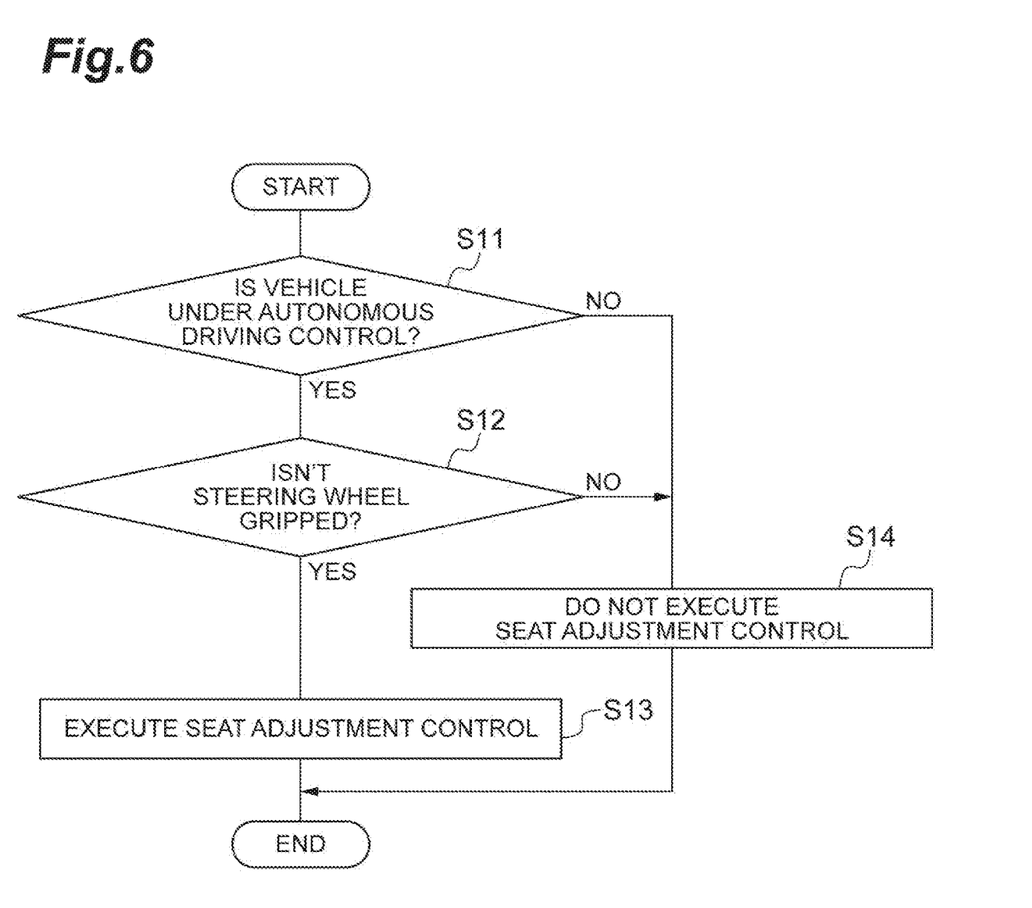
FIG. 6 is a flowchart illustrating an example of a seat adjustment control process.

As illustrated in FIG. 6, in S11, the seat control ECU 10 determines via the control condition determination unit 14 whether autonomous driving control is executed. The control condition determination unit 14 determines whether autonomous driving control is executed based on control signals from the autonomous driving ECU 50.

When the control condition determination unit 14 determines that autonomous driving control is executed in S11, the seat control ECU 10 determines via the control condition determination unit 14 whether the steering wheel SW is not gripped in S12. The control condition determination unit 14 determines whether the occupant does not grip the steering wheel SW based on a grip force of the occupant detected by the grip sensor 2. When it is determined in S12 that the occupant does not grip the steering wheel SW, in S13, the seat control ECU 10 executes seat adjustment control of FIG. 7 which will be described later.

On the other hand, when the control condition determination unit 14 determines that autonomous driving control is not executed in S11, the seat control ECU 10 ends the process of FIG. 6 without executing the seat adjustment control which will be described later. When it is determined in S12 that the occupant grips the steering wheel SW, the seat control ECU 10 ends the process of FIG. 6 without executing the seat adjustment control which will be described later.

Figure 7:
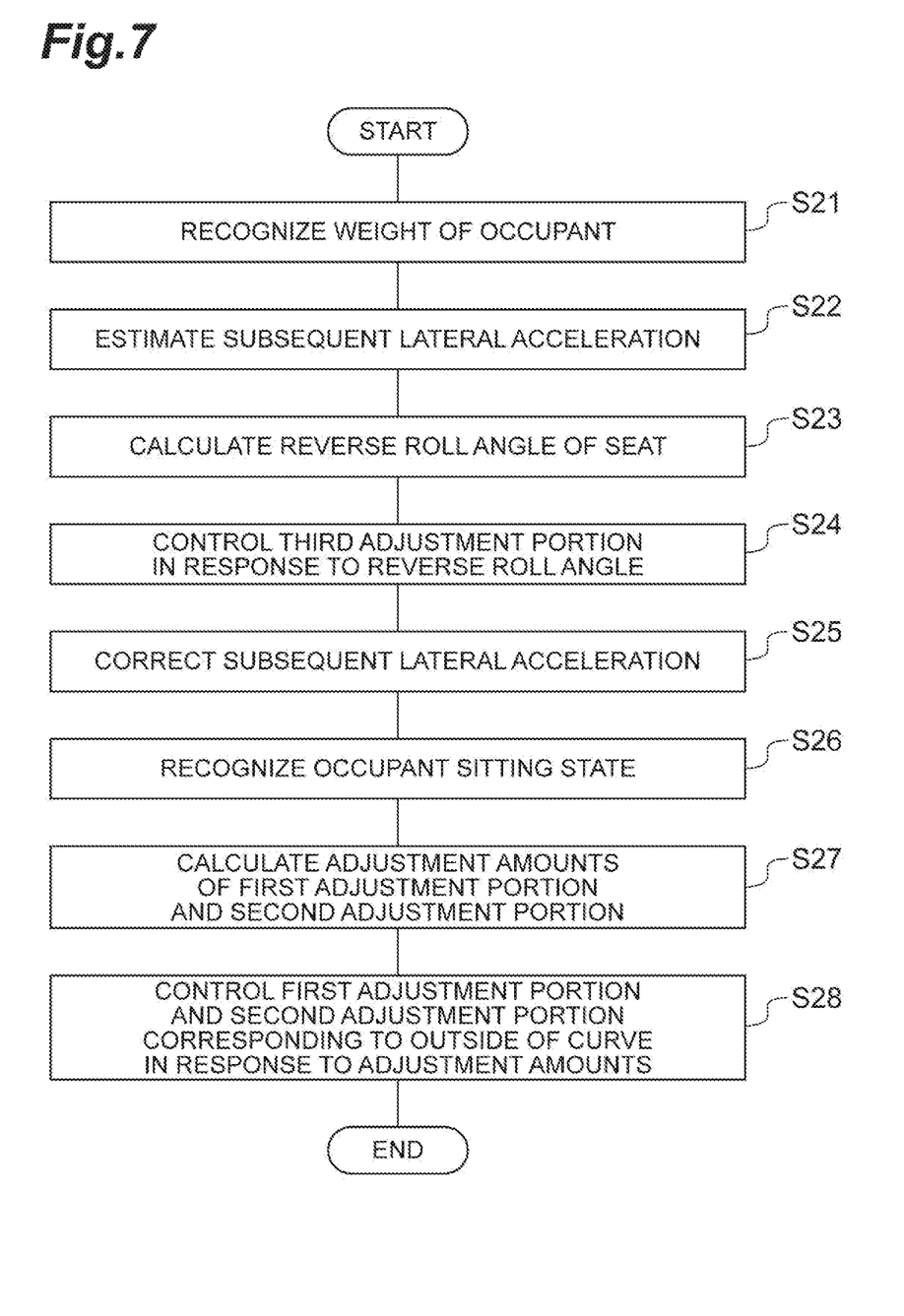
FIG. 7 is a flowchart illustrating an example of a condition determination process.

FIG. 7 is a flowchart illustrating an example of a seat adjustment control process. As illustrated in FIG. 7, in S21, the seat control ECU 10 recognizes a weight of the occupant via the occupant weight recognition unit 11. The occupant weight recognition unit 11 recognizes a weight of the occupant sitting in the seat 5, and a distribution of the weight of the occupant based on detection results of the seat sensor 1.

In S22, the seat control ECU 10 estimates a subsequent lateral acceleration of the vehicle via the lateral acceleration estimation unit 13. The lateral acceleration estimation unit 13 estimates the subsequent lateral acceleration of the vehicle based on a curvature of a curve and a target vehicle speed on a target path generated by the autonomous driving ECU 50. The lateral acceleration estimation unit 13 may estimate the subsequent lateral acceleration of the vehicle based on a vehicle speed detected by the internal sensor 53 and a curvature of a curve in the map information of the map database 54.

In S23, the seat control ECU 10 calculates the reverse roll angle θ of the seat 5 via the seat controller 15. The seat controller 15 calculates the reverse roll angle θ of the seat 5 based on the estimated subsequent lateral acceleration and the seat tilt angle map.

In S24, the seat control ECU 10 controls the third adjustment portion 6c in response to the calculated reverse roll angle θ via the seat controller 15. The seat controller 15 controls the third adjustment portion 6c such that the seat 5 is tilted at the calculated reverse roll angle θ.

In S25, the seat control ECU 10 corrects the subsequent lateral acceleration via the lateral acceleration estimation unit 13. The lateral acceleration estimation unit 13 calculates the corrected subsequent lateral acceleration, which is applied to the occupant sitting in the seat 5 tilted via the controlling of the third adjustment portion 6c, based on the uncorrected subsequent lateral acceleration and the calculated reverse roll angle (tilt angle of the seat 5) θ.

In S26, the seat control ECU 10 recognizes an occupant sitting state via the occupant sitting state recognition unit 12. The occupant sitting state recognition unit 12 recognizes the occupant sitting state based on detection results of the seat sensor 1, the grip sensor 2, the armrest sensor 3, and the seatback angle sensor 4.

In S27, the seat control ECU 10 calculates adjustment amounts of the first adjustment portion 6a and the second adjustment portion 6b via the seat controller 15. The seat controller 15 calculates the adjustment amount of the first adjustment portion 6a and the adjustment amount of the second adjustment portion 6b based on the recognized occupant sitting state, the corrected subsequent lateral acceleration, and the detected weight of the occupant.

In S28, the seat control ECU 10 controls via the seat controller 15 the first adjustment portion 6a and the second adjustment portion 6b, which correspond to an outside of the curve, in response to the calculated adjustment amounts. The seat controller 15 controls the first adjustment portion 6a corresponding to the outside of the curve such that a protrusion amount of the shoulder supporting portion 5a, which support a shoulder of the occupant sitting in the seat 5, is adjusted by the calculated adjustment amount of the first adjustment portion 6a. The seat controller 15 controls the second adjustment portion 6b corresponding to the outside of the curve such that the position of the armrest 5b is adjusted by the calculated adjustment amount of the second adjustment portion 6b.

Operational Effects of Seat Control Apparatus 100

In the seat control apparatus 100 described above, the occupant sitting state recognition unit 12 recognizes the occupant sitting state including at least either of a grip force applied to the grip portion and a load applied to the armrest 5b. The seat controller 15 controls the occupant support adjustment portion 6 in response to the adjustment amounts calculated based on the occupant sitting state and the subsequent lateral acceleration. Therefore, it is possible to adjust the occupant support adjustment portion 6 while taking into consideration the fact that a load applied to the occupant may change in response to the occupant sitting state. For this reason, it is possible to appropriately retain a posture of the occupant in response to the subsequent lateral acceleration of the vehicle and the sitting state of the occupant sitting in the seat 5.

In the seat control apparatus 100, when the vehicle is not under autonomous driving control, or the occupant grips the steering wheel SW while the vehicle is under autonomous driving control, the seat controller 15 may not control the occupant support adjustment portion 6. Therefore, it is possible to secure ease of movement when the occupant grips the steering wheel SW and performs steering.

In the seat control apparatus 100, the shoulder supporting portion 5a and the armrest 5b are respectively provided in the seat 5 on both right and left sides of the occupant, and when the vehicle travels around a curve, the seat controller 15 controls the first adjustment portion 6a and the second adjustment portion 6b which correspond to an outside of the curve. Therefore, it is possible to effectively retain a posture of the occupant via the shoulder supporting portion 5a and the armrest 5b which correspond to the outside of the curve.

Modification Example of Seat Control Apparatus 100

The embodiment of the present disclosure has been described above; however, the present disclosure is not limited to the embodiment. In addition to the embodiment, the present disclosure can be realized in various forms of modification and improvement based on the knowledge of those skilled in the art.

In the embodiment, the occupant sitting state recognition unit 12 recognizes the occupant sitting state based on detection results of the grip sensor 2, the armrest sensor 3, and the seatback angle sensor 4; however, the seatback angle sensor 4 may be omitted. The occupant sitting state recognition unit 12 may recognize the occupant sitting state based on a detection result of at least either of the grip sensor 2 and the armrest sensor 3. The detection result of the grip sensor 2 may not necessarily include a grip force applied to the steering wheel SW. The detection result of the grip sensor 2 may include at least a grip force of the occupant applied to the posture retention grip G.

The occupant supporting portion of the seat 5 include the shoulder supporting portion 5a, the armrest 5b, and the seat tilting unit 5c; however, the occupant supporting portion may be at least one of the shoulder supporting portion 5a, the armrest 5b, and the seat tilting unit 5c. The occupant supporting portion may be another part of the seat 5 or a member around the seat 5 which has the function of restricting or preventing movement of the occupant in the lateral direction.

Such part of the seat 5 may be a part supporting a side part of the waist of the occupant sitting in the seat 5, or a part supporting a side part of a thigh of the occupant sitting in the seat 5, for example. In this case, the occupant support adjustment portion 6 may be a mechanism, an airbag, or the like which is capable of advancing or retracting from the waist or the thigh of the occupant so as to adjust a protrusion amount of a part of the seat 5 which is in contact with the occupant.

Such member around the seat 5 may be a stepped portion or the like which is provided on an interior door lining of the vehicle so as to serve as an elbow rest of the occupant sitting in the seat 5, for example. In this case, the occupant support adjustment portion 6 may be a mechanism which adjusts the position of the stepped portion in the vertical direction of the vehicle, specifically, adjusts the position of the stepped portion, that is, the member around the seat 5 with respect to an elbow or an arm of the occupant. The occupant support adjustment portion 6 may be a mechanism, an airbag, or the like which is capable of advancing or retracting from an elbow or an arm of the occupant so as to adjust a protrusion amount of a part which is in contact with the elbow or the arm of the occupant.

In the embodiment, the seat control ECU 10 determines whether to execute the seat adjustment control of FIG. 7 based on a result of the condition determination process of FIG. 6; however, the condition determination process of FIG. 6 may not necessarily be executed. In this case, the control condition determination unit 14 may determine whether to execute the seat adjustment control in connection with whether to execute the autonomous driving control based on control signals from the autonomous driving ECU 50. Alternatively, the control condition determination unit 14 may determine whether to execute the seat adjustment control in response to an ON or OFF state of a switch operated by the occupant regardless of whether the autonomous driving control is executed.

In the embodiment, in S28 of FIG. 7, the seat controller 15 controls the first adjustment portion 6a and the second adjustment portion 6b which correspond to an outside of a curve; however, the seat controller 15 may control the first adjustment portion 6a and the second adjustment portion 6b by the same adjustment amounts, which correspond to an inside of the curve. Alternatively, the seat controller 15 may control the first adjustment portion 6a and the second adjustment portion 6b, which correspond to an inside of a curve, by adjustment amounts less than adjustment amounts of the adjustment portion 6a and the second adjustment portion 6b which correspond to an outside of the curve. The seat controller 15 may control either one of the first adjustment portion 6a and the second adjustment portion 6b.

The vehicle is an autonomously controlled vehicle; however, the vehicle may not necessarily be an autonomously controlled vehicle. In this case, the control condition determination unit 14 may determine whether to execute the seat adjustment control in response to an ON or OFF state of an in-vehicle switch operated by the occupant.

In the embodiment, the third adjustment portion 6c adjusts the seat tilting unit 5c such that the entirety of the seat 5 is tilted at the reverse roll angle θ; however, the third adjustment portion 6c may adjust the seat tilting unit 5c such that only the sitting surface Se of the seat 5 is tilted, and thus the upper body of the occupant is tilted toward the center of curvature of a curve at the reverse roll angle θ.

Control to reversely roll the seat 5 via the third adjustment portion 6c may be omitted. In this case, instead of using a subsequent lateral acceleration which is corrected via the equation (1) while taking into consideration the tilt of the seat 5 made by the third adjustment portion 6c, the seat controller 15 may use an uncorrected subsequent lateral acceleration as a subsequent lateral acceleration estimated by the lateral acceleration estimation unit 13.

In the embodiment, the seat controller 15 calculates adjustment amounts of the first adjustment portion 6a and the second adjustment portion 6b based on the preset map; however, the seat controller 15 may calculate adjustment amounts of the first adjustment portion 6a and the second adjustment portion 6b via the following equation (2).

$$y = y_0 + a \cdot x_1 + b \cdot x_2 + c \cdot x_3 + d \cdot x_4 + e \cdot x_5 \quad (2)$$

y: load to occupant
$x_1$: grip force applied to the posture retention grip G
$x_2$: load applied to the armrest 5b
$x_3$: support force for supporting the vicinity of scapula of occupant
$x_4$: support force for supporting the vicinity of upper chest of occupant
$x_5$: friction force (support force) between back of occupant and the seatback 5d
$y_0$: load to occupant when $x_1$ to $x_5$ are zero
a to e: coefficient (negative value) approximately determined under predetermined conditions In the equation (2), a grip force applied to the posture retention grip G and detected by the grip sensor 2 is substituted into $x_1$. A load applied to the armrest 5b and detected by the armrest sensor 3 is substituted into $x_2$. A load applied to the occupant is substituted into $y_0$, the load being calculated by the seat controller 15 based on a weight of the occupant recognized by the occupant weight recognition unit 11 and a subsequent lateral acceleration estimated by the lateral acceleration estimation unit 13. It is possible to calculate adjustment amounts of the first adjustment portion 6a and the second adjustment portion 6b by determining support forces of $x_3$ to $x_5$ in a state where coefficients approximately determined under predetermined conditions are substituted into "a" to "e". The support forces of $x_3$ to $x_5$ are determined such that the load "y" applied to the occupant is less than or equal to a target load value, for example. The target load value is a target value for a load corresponding to a burden that the occupant feels to retain a posture.

Examples of the predetermined conditions to determine "a" to "e" include a body type (for example, standard body type) of the occupant and an occupant sitting state (for example, sitting state where an elbow is placed on the armrest 5b) as a reference.

Each of support forces of $x_3$ to $x_5$ is temporarily set in an adjustment state of the occupant support adjustment portion 6, which is a reference, so as to calculate adjustment amounts of the first adjustment portion 6a and the second adjustment portion 6b. The adjustment state of the occupant support adjustment portion 6, which is a reference, indicates a state where the occupant support adjustment portion 6 is not adjusted. It is possible to calculate target values for the temporarily set support forces of $x_3$ to $x_5$ by comparing the target load value with the load "y" applied to the occupant which is obtained as the result. While the degree of freedom of adjustment of the occupant support adjustment portion 6 (performance of adjustment portion) is taken into consideration, the target values for the support forces of $x_3$ to $x_5$ may be determined such that the occupant sitting in the seat 5 does not feel cramped.

What is claimed is:

1. A seat control apparatus that controls a seat of a vehicle in which an occupant of the vehicle sits, the apparatus comprising:
   an occupant weight recognition unit configured to recognize a weight of the occupant sitting in the seat;
   an occupant sitting state recognition unit configured to recognize an occupant sitting state including at least either of a grip force of the occupant detected by a grip sensor provided in a grip portion which the occupant sitting in the seat is capable of gripping, and a load applied to the occupant and detected by an armrest sensor provided in an armrest of the seat;
   a lateral acceleration estimation unit configured to estimate a subsequent lateral acceleration of the vehicle based on a curvature of a road on which the vehicle travels and a vehicle speed of the vehicle; and
   a seat controller configured to control the seat based on the occupant sitting state and the subsequent lateral acceleration,
   wherein the seat has an occupant support adjustment portion including at least one of a first adjustment portion configured to adjust a protrusion amount of a shoulder supporting portion supporting a shoulder of the occupant sitting in the seat, a second adjustment portion configured to adjust a position of the armrest; and a third adjustment portion configured to adjust a tilt angle of the seat in a roll angle direction of the vehicle, and
   wherein the seat controller calculates an adjustment amount of the occupant support adjustment portion based on the occupant sitting state and the subsequent lateral acceleration, and controls the occupant support adjustment portion in response to the calculated adjustment amount.

2. The seat control apparatus according to claim 1,
   wherein the vehicle is a vehicle capable of executing an autonomous driving control,
   wherein the grip portion includes a steering wheel of the vehicle,
   wherein the occupant sitting state recognition unit recognizes the occupant sitting state of whether the occupant grips the steering wheel based on a grip force applied to the steering wheel, and
   wherein when the vehicle is not under autonomous driving control, or the occupant grips the steering wheel while the vehicle is under autonomous driving control, the seat controller does not control the occupant support adjustment portion.

3. The seat control apparatus according to claim 1,
   wherein the shoulder supporting portion and the armrest are respectively provided in the seat on both right and left sides of the occupant, and
   wherein when the vehicle travels around a curve, the seat controller controls the first adjustment portion and the second adjustment portion which correspond to an outside of the curve.

4. The seat control apparatus according to claim 2,
   wherein the shoulder supporting portion and the armrest are respectively provided in the seat on both right and left sides of the occupant, and
   wherein when the vehicle travels around a curve, the seat controller controls the first adjustment portion and the second adjustment portion which correspond to an outside of the curve.

* * * * *